(12) United States Patent
Fishman et al.

(10) Patent No.: US 9,723,564 B2
(45) Date of Patent: Aug. 1, 2017

(54) SYSTEMS AND METHODS FOR POWER MANAGEMENT OF A MODULAR MOBILE ELECTRONIC DEVICE

(71) Applicant: Google Inc., Mountain View, CA (US)

(72) Inventors: David Fishman, Mountain View, CA (US); Seth Newburg, Mountain View, CA (US); Ara Knaian, Mountain View, CA (US); Paul Eremenko, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/680,944

(22) Filed: Apr. 7, 2015

(65) Prior Publication Data

US 2015/0289209 A1    Oct. 8, 2015

Related U.S. Application Data

(60) Provisional application No. 61/976,205, filed on Apr. 7, 2014.

(51) Int. Cl.
*H04W 52/02* (2009.01)
*H04M 1/725* (2006.01)
*H04M 1/02* (2006.01)

(52) U.S. Cl.
CPC ... *H04W 52/0261* (2013.01); *H04W 52/0222* (2013.01); *H04W 52/0258* (2013.01); *H04M 1/0254* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 4,658,333 A | 4/1987 | Grimes | |
| 4,856,088 A | 8/1989 | Oliwa et al. | |
| 4,904,549 A | 2/1990 | Goodwin et al. | |
| 4,974,317 A | 12/1990 | Rodriguez, II et al. | |
| 5,895,230 A | 4/1999 | Bartley | |

(Continued)

FOREIGN PATENT DOCUMENTS

WO    2013120723 A1    8/2013

OTHER PUBLICATIONS https://youtu.be/oDAw7vW7H0c.

*Primary Examiner* — Robert C Scheibel
(74) *Attorney, Agent, or Firm* — Dority & Manning, P.A.

(57) ABSTRACT

Systems and methods for power management of a mobile electronic device. During operation of a modular mobile electronic device, module power characteristic data of a plurality of modules coupled to the electronic device is collected. Each module is coupled to the electronic device via a respective module interface of the electronic device. A module power model is updated for at least one module of the plurality of modules based on module power characteristic data collected for the at least one module. A context-aware power budget of the electronic device is updated based on updating of the module power model for the at least one module. Module power flow of the electronic device is adapted based on updates to the context-aware power budget. Adapting module power flow includes adapting allocation of power in real-time to at least one power consumer module coupled the electronic device via a respective module interface.

20 Claims, 12 Drawing Sheets

(56) References Cited

U.S. PATENT DOCUMENTS

| | | |
|---|---|---|
| 5,983,303 A | 11/1999 | Sheafor et al. |
| 6,862,173 B1 | 3/2005 | Konshak et al. |
| 7,458,815 B2 | 12/2008 | Fallah-Adl et al. |
| 7,509,094 B2 | 3/2009 | Moran et al. |
| 7,618,260 B2 | 11/2009 | Daniel et al. |
| 7,953,455 B2 | 5/2011 | Moran et al. |
| 8,154,244 B1* | 4/2012 | Gorham ............ H01M 10/482 320/103 |
| 8,180,395 B2 | 5/2012 | Moran et al. |
| 8,249,656 B2 | 8/2012 | Sherman et al. |
| 8,285,342 B2 | 10/2012 | Moran et al. |
| 8,509,848 B1 | 8/2013 | Cole |
| 2003/0118006 A1 | 6/2003 | Yang et al. |
| 2004/0212941 A1* | 10/2004 | Haas .................... G06F 1/3203 361/90 |
| 2005/0085277 A1* | 4/2005 | Chen .................... G06F 1/3215 455/572 |
| 2005/0190124 A1 | 9/2005 | Manabe |
| 2006/0019723 A1* | 1/2006 | Vorenkamp ....... H04W 52/0258 455/574 |
| 2007/0099593 A1 | 5/2007 | Thome et al. |
| 2008/0028237 A1* | 1/2008 | Knight .................... H04L 12/66 713/300 |
| 2008/0168282 A1 | 7/2008 | Brundridge |
| 2008/0197825 A1 | 8/2008 | Siri |
| 2008/0224769 A1 | 9/2008 | Markowski et al. |
| 2009/0124288 A1 | 5/2009 | Song et al. |
| 2009/0167245 A1 | 7/2009 | Nguyen |
| 2009/0275367 A1* | 11/2009 | Reinisch ............. H04M 1/7253 455/572 |
| 2009/0280865 A1 | 11/2009 | Danis et al. |
| 2010/0073202 A1 | 3/2010 | Mazed |
| 2010/0220432 A1 | 9/2010 | Wise et al. |
| 2010/0273486 A1* | 10/2010 | Kharia ............. H04W 52/0261 455/436 |
| 2010/0302028 A1 | 12/2010 | Desai et al. |
| 2010/0323238 A1 | 12/2010 | Takahashi et al. |
| 2011/0157815 A1 | 6/2011 | Lin |
| 2011/0179405 A1 | 7/2011 | Dicks et al. |
| 2011/0207509 A1* | 8/2011 | Crawford .......... H04W 52/0258 455/574 |
| 2011/0264944 A1 | 10/2011 | Newman |
| 2012/0293934 A1 | 11/2012 | Boduch et al. |
| 2013/0008707 A1 | 1/2013 | Kim |
| 2013/0026572 A1 | 1/2013 | Kawa et al. |
| 2013/0103212 A1* | 4/2013 | Andiappan ....... H04W 52/0225 700/286 |
| 2013/0110423 A1* | 5/2013 | Zimmermann ... H04W 52/0254 702/61 |
| 2013/0155600 A1 | 6/2013 | Ross et al. |
| 2013/0311803 A1* | 11/2013 | Wang ................... G06F 1/3212 713/320 |
| 2014/0009980 A1 | 1/2014 | Divan et al. |
| 2015/0181529 A1* | 6/2015 | Birnbaum ......... H04W 52/0261 370/311 |
| 2015/0358790 A1 | 12/2015 | Nasserbakht |

\* cited by examiner

SYSTEMS AND METHODS FOR POWER MANAGEMENT OF A MODULAR MOBILE ELECTRONIC DEVICE

CROSS-REFERENCE TO RELATED APPLICATIONS

This application claims the benefit of U.S. Provisional Application Ser. No. 61/976,205, filed on 7-Apr.-2014, which is incorporated in its entirety by this reference.

TECHNICAL FIELD

This invention relates generally to the mobile electronics field, and more specifically to new and useful systems for enabling power management of a modular mobile electronic device in the mobile electronics field.

BACKGROUND

Current methods of mobile electronic device design create devices that are static, both in terms of functionality and in terms of design. Companies try to solve this problem by producing a wide range of devices having different functionalities and different designs. As a result, users of such devices are forced to make compromises; they lack the ability to customize the functionality and design of their mobile devices to truly meet their needs and preferences. Modular mobile electronic devices may serve to meet user needs and preferences. Like all mobile electronic devices, modular mobile electronic devices must make efficient use of power or be hindered in their usefulness by large batteries and/or frequent charging. Managing power is especially difficult for modular mobile electronic devices because both power consumption and power available depend greatly on the configuration of the modular mobile electronic devices. Thus, there is a need in mobile electronics field to create systems and methods for managing power of a modular mobile electronic device. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Power Management of a Modular Mobile Electronic Device

Figure 1:
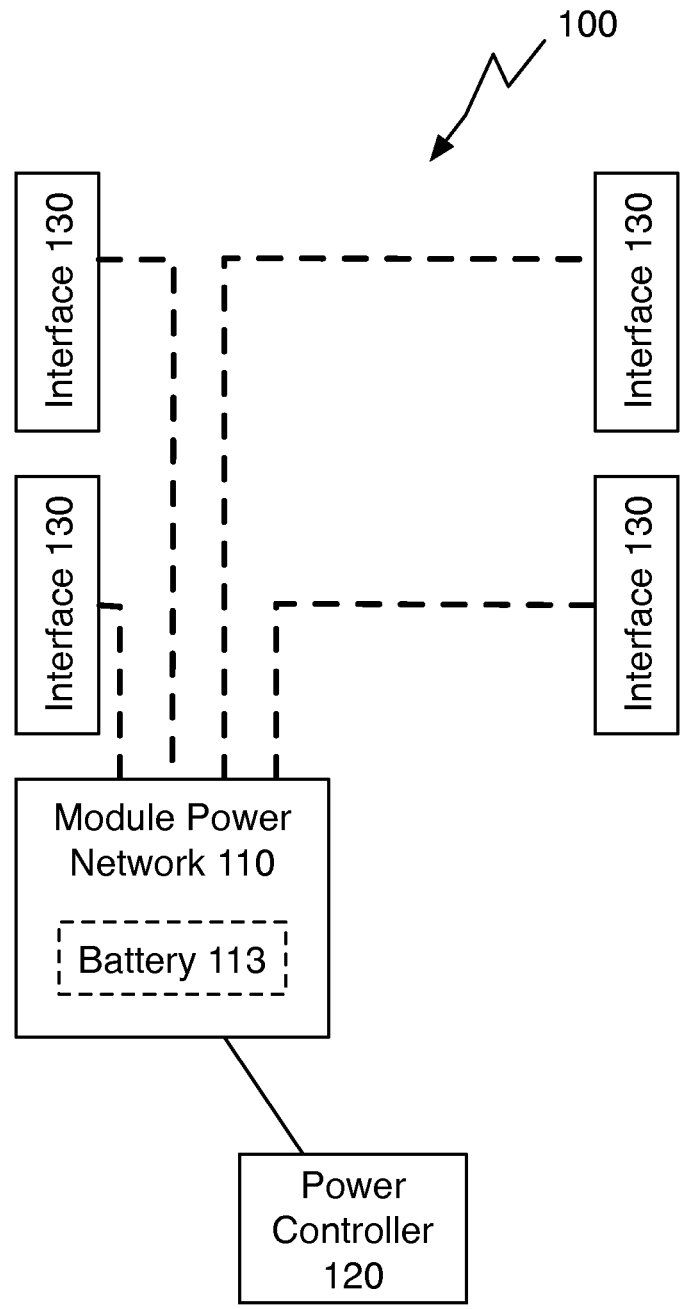
FIG. 1 is a diagram view of a system of a preferred embodiment.

As shown in FIG. 1, a system 100 for power management of a modular mobile electronic device includes a module power network (MPN) 110, a power controller 120, and a plurality of module interfaces 130.

The system 100 functions to enable power management for a modular mobile electronic device. Power management is of importance for all mobile electronic devices: mobile electronic devices must make efficient use of power or be hindered in their usefulness by large batteries and/or frequent charging. Power management is even more important for modular mobile electronic devices because both power consumption and power available depend greatly on the configuration of the modular mobile electronic devices. This dependence means that power management systems for mobile electronic devices should be efficient in managing power resources and power consumption for a wide variety of modular mobile electronic device configurations.

The modular mobile electronic device of the system 100 is preferably the modular mobile electronic device of U.S. Provisional Application No. 61/976,173, which is incorporated in its entirety by this reference, but may additionally or alternatively be any suitable modular mobile electronic device.

Figure 2:
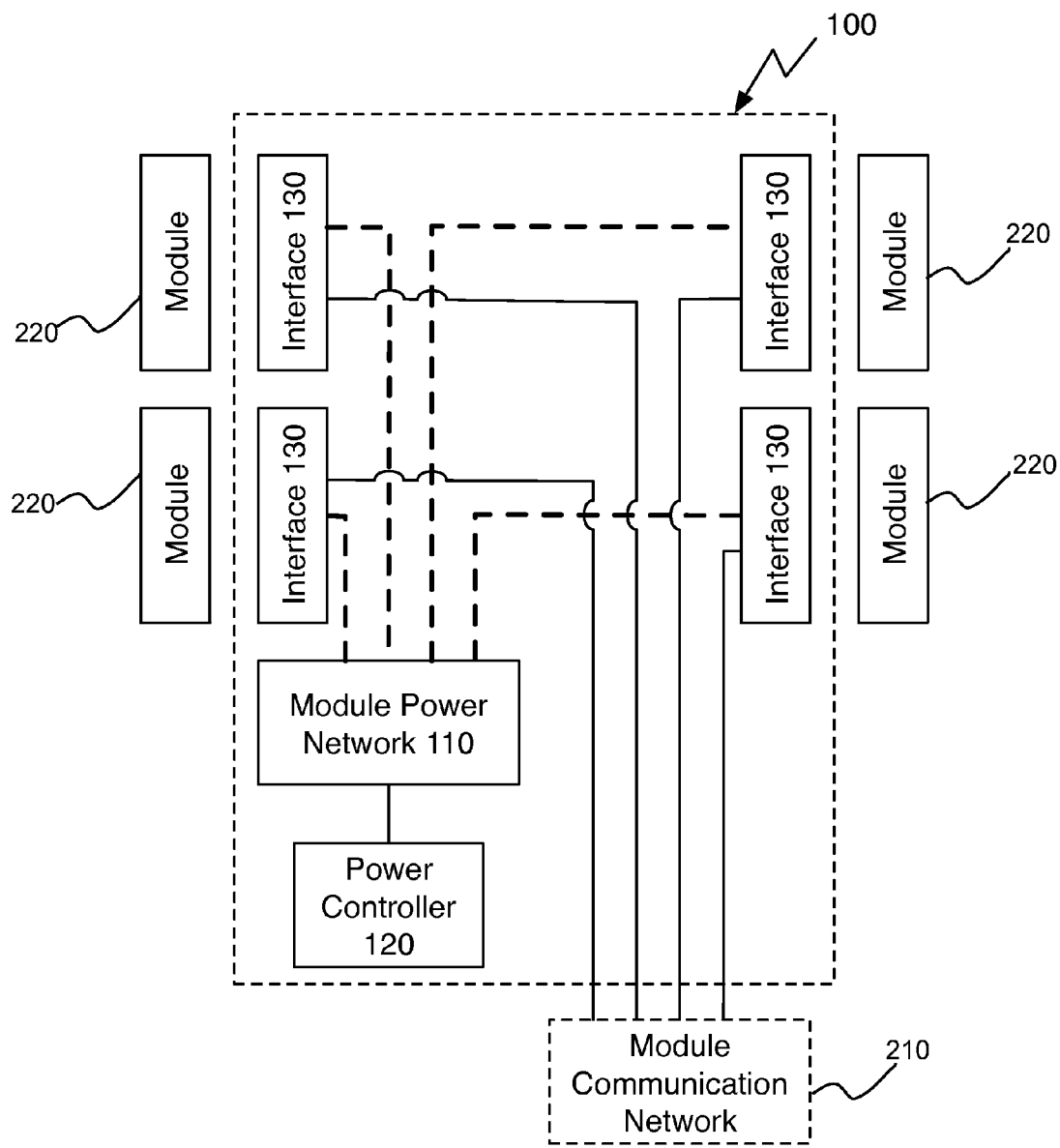
FIG. 2 is a diagram view of a modular electronic device based on a system of a preferred embodiment.
Figure 3A:
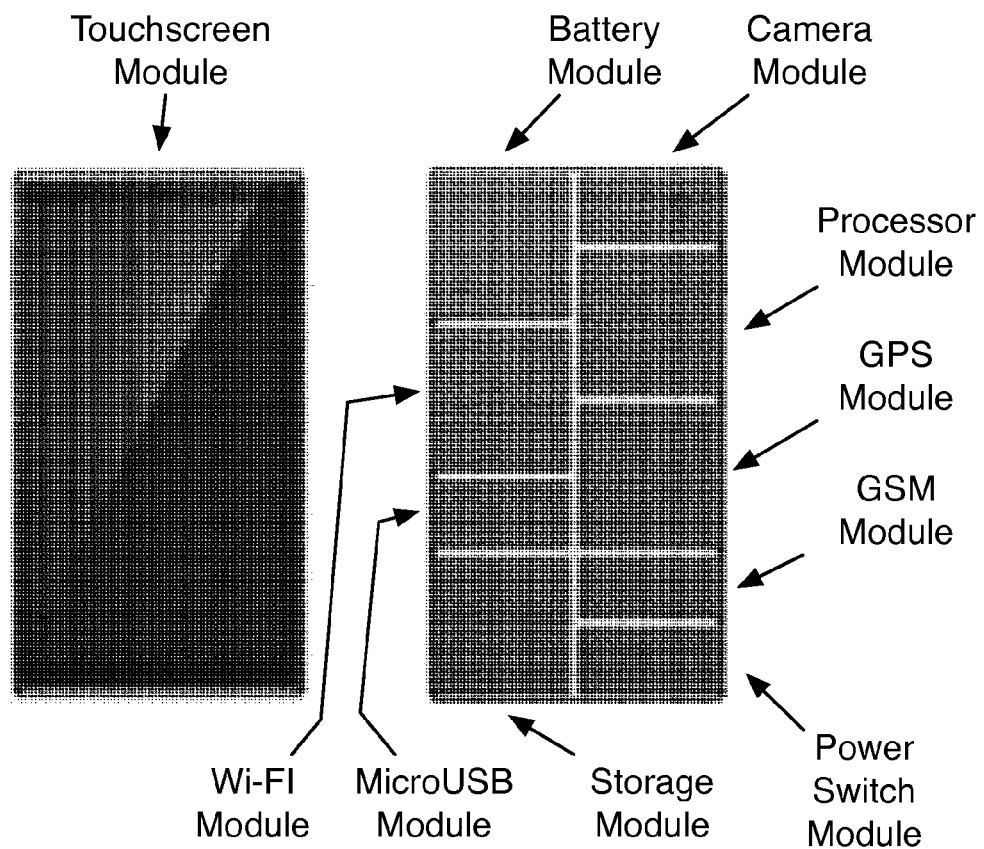
FIGS. 3A and 3B are image views of example modular electronic devices based on a system of a preferred embodiment.

As shown in FIG. 2, the modular mobile electronic device preferably includes a module communication network 210, a plurality of modules 220, and the system 100. The modular mobile electronic device is preferably created and/or modified through the use of user-removable modules. Modules preferably communicate with each other using the module communication network and receive power from or send power to each other using the module power network 110 of the system 100. The power controller 120 preferably manages the module power network 110, but may additionally or alternatively manage the modules as well. When multiple modules are connected to the modular communication network and the system 100, the modules in confederation are preferably enabled to serve as a mobile electronic device. The mobile electronic device created by such a confederation is preferably characterized by the confederated modules as well as the parameters of confederation, which are preferably determined by the module communication network, the system 100 and the confederated modules. As shown in FIG. 3A, a modular mobile electronic device configured to serve as a smartphone is an example of a possible mobile electronic device enabled by the system 100. Other examples of possible modular mobile electronic devices include those configured to serve as tablets, laptops, media players, cameras, measurement devices, gaming systems, vehicular computing devices, set-top boxes, and televisions.

Figure 3B:
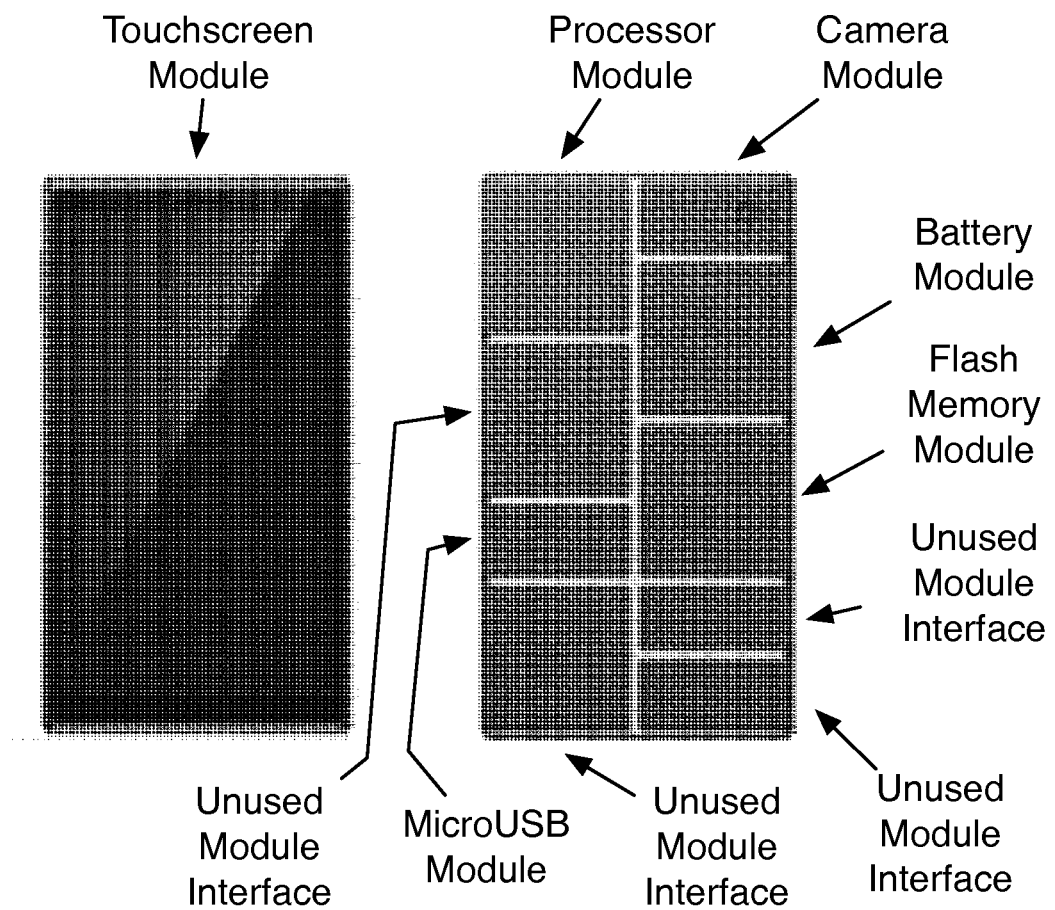

Modules connected to the modular mobile electronic device are preferably user-removable and replaceable, enabling users to create mobile electronic devices with highly varied form and functionality. For example, as shown in FIG. 3B, a user may connect a camera module, a flash memory module, a processor module, a battery module, and a touchscreen LCD module to create a small and lightweight camera. The user could later add a cell-phone radio module and a microphone/speaker module to create a camera phone. Modules preferably follow an open and free standard, enabling almost anyone to be a module developer.

The flexibility afforded by module confederation preferably allows for a number of favorable outcomes. Users can purchase only the modules necessary for their needs, allowing for reductions in cost. Users can also choose to replace modules or add additional modules later. In combination, these two outcomes may help increase accessibility to mobile electronic devices (and in many cases, the internet) throughout the world, especially for people for whom a smartphone or a PC is not currently a good value proposition. For example, a user may buy a modular mobile electronic device with a basic set of modules at a low price point, and transition to a more advanced phone by adding modules later on. These two outcomes may also help slow the creation of electronic waste by allowing mobile electronic devices to be upgraded or modified rather than replaced. Further, because the modular mobile electronic device is compatible with modules of highly varied form and function, and because modules are preferably based on an open standard, module confederation may allow small or specialized companies to make modules playing to their strengths without designing a full mobile electronic device.

The system 100 is preferably compatible with a large range of module types. Modules may serve any function or purpose as long as they are capable of communicating over the module communication network and connecting to the system 100. Some example module types include sensor modules, processor modules, storage modules, communication modules, display modules, and power modules. Examples of sensor modules include accelerometer modules, GPS modules, camera modules, depth imaging modules, fingerprint reader modules, biometric modules, microphone modules, digital/analog input modules, haptic input modules, infrared flash modules, pedometer modules, barometer modules, magnetometer modules, and gyroscope modules. Examples of processor modules include application processor modules and graphics processor modules. Examples of storage modules include flash memory modules and RAM modules. Examples of communication modules include Wi-Fi radio modules, GSM/CDMA radio modules, HDMI connector modules, NFC modules, Bluetooth radio modules, and USB connector modules. Examples of display modules include touchscreen LCD modules, non-touch graphical display modules, and e-ink display modules. Examples of power modules include battery modules, solar panel modules, and battery charging modules. The variety of modules preferably serve to provide various options and combinations of inputs, outputs, data storage, data processing, communication, power, and other suitable aspects of a computing device. Note that these example module types are in no way exhaustive or exclusive; i.e., modules may incorporate functionality from many of these example types or from none at all, and modules may additionally or alternatively incorporate suitable functionality not herein described.

The module power network 110 functions to distribute power to the modules of the modular mobile electronic device. The module power network no preferably enables any module connected to the system 100 to send power to or receive power from any other module connected to the system 100. The module power network no preferably enables power transfer between modules by connecting each module to a common power bus (e.g., the power bus 602 of FIG. 6) of the module power network no through a module interface 130, but may additionally or alternatively enable direct power transfer between modules using any alternative connection architecture (e.g., a switched power architecture). The module power network 110 preferably connects to the module interfaces 130 via conductive wires but may additionally or alternatively connect to the module interfaces 130 electrically via any suitable connection method.

The module power network 110 in particular preferably supports three types of modules (note that some modules may be more than one type): power consuming modules (e.g., camera, display), power producing modules (e.g., charger, solar panel), and power storing modules (e.g., batteries, capacitors). The module power network no preferably supports hot-swapping modules, including battery modules.

The module power network 110 preferably operates at a single unregulated DC voltage set in part by power sources connected to the module power network 110. More preferably, the module power network no is designed to operate at a bus voltage of 3.3V to 4.8V DC. In this scenario, the module power network no voltage is set by the highest voltage power source on the power bus. This allows batteries (which vary with voltage over usage/time) to be used directly without suffering double conversion losses. Additionally or alternatively, the module power network no may operate at a single regulated DC voltage, multiple (regulated or unregulated) DC voltages, AC voltages, or any combination thereof.

The module power network no preferably includes power monitor/control units (hereafter PMC) (e.g., PMC in of FIG. 6) and more preferably includes one PMC in for each module interface 130. The PMCs 111 function to monitor and/or control power going to and coming from module interfaces 130. Having one PMC in for each module interface 130 allows module interfaces 130 to be switched on or off individually, for power consumption to be measured per-module, and for power state settings to be applied on a per-module basis. The PMCs 111 are preferably controlled by the power controller 120 but may additionally or alternatively be controlled by any other suitable source. Each PMC 111 preferably includes an interface voltage monitor, and interface voltage limiter, an interface current monitor, an interface current limiter, and an interface switch. The interface voltage and current monitors preferably monitor the voltage at an interface and the current through an interface. The interface current limiter preferably prevents an interface from drawing too much current due to a short or a module malfunction, and the interface switch preferably controls whether an interface is connected to the module power network no. Additionally or alternatively, the interface current limiter may limit current in any way and for any purpose. For example, the interface current limiter may be used to limit module current draw during module bootup (after which point the module may be able to access higher current values). Analogously, the interface voltage limiter may limit voltage in any way and for any purpose. The PMCs 111 may additionally or alternatively include any hardware that enables the module power network 110 to perform monitoring, control, and/or routing of power on the module power network 110.

Modules connected to the module power network 110 preferably are capable of operating on the power bus at any voltage supplied by the power bus inside operating range. If, for some reason, modules require certain regulated voltages (and do not include switching power converters), the module power network no may additionally include one or more switching power converters 112. The switching power converter 112 functions to regulate and convert the voltage of the power bus to other voltages; for example, converting the 3.3-4.8 VDC voltage of a power bus to regulated 3.3V and 1.2V lines.

Figure 4:
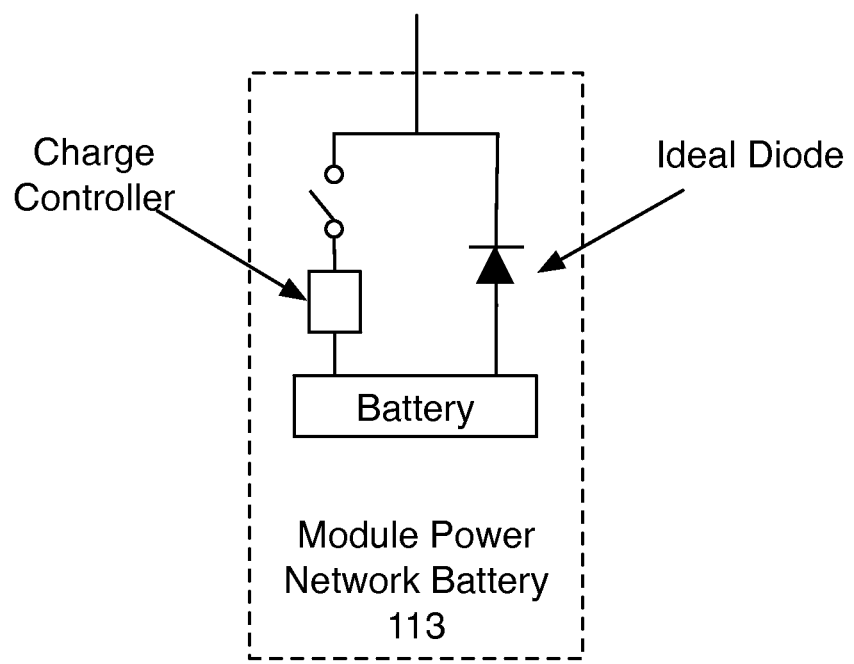
FIG. 4 is a diagram view of a module power network battery of a system of a preferred embodiment.

The module power network (MPN) no may additionally include a module power network battery 113. The module power network battery 113 functions to make sure that the power controller 120 has power even when no power source module is connected (enabling, for instance, the hot-swap of battery modules). The module network battery 113 may additionally provide power to other modules (e.g. while a battery module is being hot-swapped for another). The module network battery 113 may be any type of power storage device (e.g., Li-Ion battery, supercapacitor, compressed fluid storage). As shown in FIG. 4, the module power network battery 113 preferably includes a charging circuit that includes a charge controller, a charging switch, and an ideal diode controller. This charging circuit preferably prevents current from flowing into the battery of the module power network battery 113 when the battery is not being charged (via the ideal diode controller), and also manages the rate and method of charging when the battery is being charged (via the charge controller).

The power controller 120 functions to monitor, manage, and/or control the module power network 110. The power controller 120 may additionally or alternatively monitor, manage, and/or control modules of the modular mobile electronic device. The power controller 120 preferably communicates with modules of the modular mobile electronic device through the module communication network, but may additionally or alternatively communicate with the modules in any suitable manner, including through the module power network no. The power controller 120 preferably includes a microprocessor or microcontroller, and storage (e.g., flash memory, EEPROM). The power controller 120 is preferably directly connected to components of module power network no, but may additionally or alternatively monitor and/or control power in any suitable manner.

The power controller 120 preferably includes a set of power states, which functions to enable the capability to operate in multiple power modes. The set of power state preferably includes at least a sleep state and an active state. In the sleep state, the power controller 120 preferably draws only a small amount of power, but can quickly be woken if necessary. The sleep state might be used when no modules are connected to the system 100 or when the modules do not need to transmit or receive power from other modules connected to the system 100.

The power controller 120 preferably manages the module power network 110 in three primary ways: through the PMCs 111, through the module power network battery 113 (if present), and through communication with modules; but may additionally or alternatively manage the module power network no in any suitable manner. For example, if the module power network no includes a switching power converter 112, the power controller 120 may also manage the module power network 110 via control of the switching power converter 112.

The power controller 120 preferably manages the module power network no through the PMCs in by monitoring and/or controlling the power flowing through each PMC 111. Monitoring current and voltage at the PMC 111 preferably allows the power controller 120 to ensure that modules operate within specified parameters (for instance, not drawing too much current or providing an overly high voltage to the module power network no). Controlling the power through the PMC 111 preferably includes limiting current that can flow through the PMC 111 (in either direction). Current limiting may help prevent a module interface 130 short from drawing too much power, for instance. Controlling the power through the PMC 111 may additionally or alternatively include switching the PMC in such that current can no longer travel through it; if the PMC 111 is directly in front of a module interface 130, switching the PMC 111 essentially disconnects the module interface 130 from the module power network 110.

The power controller 120 preferably manages the module power network 110 through the module power network battery 113 by communicating with the battery and/or directly controlling module power network battery 113 circuitry. Particularly, the power controller 120 preferably controls whether the module power network battery 113 is in a charging mode (e.g., the module power network battery 113 can draw power from the module power network no), a supply mode (e.g., the module power network battery 113 can supply power to the module power network no), or a disconnect mode (e.g., the module power network battery 113 is isolated from the module power network no). It may control this by sending control signals to the module power network battery 113 or by directly altering the state of circuitry connected to the module power network battery 113.

The power controller 120 preferably manages the module power network 110 through communication with modules over the module communication network but may additionally or alternatively communicate with modules in any other suitable manner.

The power controller 120 preferably manages the module power network 110 through communication with the modules by managing module power production, managing module power storage, and managing module power consumption.

The power controller 120 preferably manages module power production by identifying power producing modules, analyzing power production, and controlling power production.

The power controller 120 preferably identifies power producing modules through communication with the modules; the modules preferably provide identification data to the power controller 120 indicating their power production capabilities. Additionally or alternatively, the power controller 120 may identify power producing modules by measuring current flow from a module to the module power network 110 using a PMC 111, or by any other suitable means.

The power controller 120 preferably analyzes power producing modules by collecting data on the power producing modules from the modules and/or the PMCs 111. This data may include power production data (output voltage, output current, voltage/current waveform, duty cycle, etc.), contextual data (state of the power producing module, presence of other modules, state of other modules, state of the system 100), and any other data relevant to the power producing modules. The power controller 120 preferably correlates this data to create a model of power production for each power producing module given time, context (e.g. state of the power producing module . . . ), and other relevant variables. These models are preferably combined to create a model of the entire power production capability of the modular mobile electronic device. In one example, a solar power module produces a particular output voltage and current for a given time of day, location, device orientation, and set of weather conditions. These factors are preferably taken into account in the model for the power production of the solar power module. In another example, a fuel cell module produces a particular output voltage and current for a particular fuel cell size, fuel type, and operating temperature. Likewise, these factors are preferably taken into account in the model for the power production of the fuel cell module.

The power controller 120 preferably controls power production through communication with the power producing modules and/or the PMCs 111. The power controller 120 preferably controls power production in accordance with system power demand and/or power producing module identification data. The power controller 120 preferably controls power production by directing power producing modules to produce power according to power production states set by the power controller 120. These power production states preferably include whether the power producing module should be producing power, and any settings relating to how the power producing module produces power (e.g. output voltage, fuel burn rate, output current). The power controller 120 may additionally or alternatively control power production through use of the PMCs in (for example, disconnecting a module that continues to try to produce power when directed not to).

One example of power production control in accordance with system power demand and power producing module identification data is as follows: a modular mobile electronic device contains three power producing modules (fuel cell module, solar power module, and wall charger module). The module power network 110 of the modular mobile electronic device uses a power bus (e.g., 602 of FIG. 6); module voltage regulation and the PMCs 111 allow power production modules to be operated in parallel on the bus. The fuel cell module is capable of producing 5 W at 5V DC for two hours (2000 mAh capacity) and is non rechargeable. The wall charger is capable of producing 10 W at 5V DC whenever plugged into a wall charger. The solar power module includes a boost converter and outputs anywhere from 0-1 W at 5V DC depending on illumination. These capabilities are known to the power controller 120 (as module identification data). The module power network no directs the wall charger power module and solar power module to produce power whenever possible, but directs the fuel cell module to only produce power in critical situations (as the fuel cell has a limited production capability).

The power controller 120 preferably manages module power storage by identifying power storage modules, analyzing power storage, creating a context-aware power budget, and controlling power storage.

The power controller 120 preferably identifies power storage modules through communication with the modules; the modules preferably provide identification data to the power controller 120 indicating their power storage capabilities. Additionally or alternatively, the power controller 120 may identify power storage modules by any other suitable means.

The power controller 120 preferably analyzes power storage modules by collecting data on the power storage modules from the modules and/or the PMCs 111. This data may include power storage data (output voltage, output current, voltage/current waveform, duty cycle, charge rate, capacity, etc.), contextual data (state of the power storage module, presence of other modules, state of other modules, state of the system 100), and any other data relevant to the power storage modules. The power controller 120 preferably correlates this data to create a model of power storage for each power storage module given time, context (e.g. state of the power storage module . . . ), and other relevant variables. These models are preferably combined to create a model of the entire power storage capability of the modular mobile electronic device. In one example, a battery module produces a particular output voltage and current for a given temperature and charge percentage. These factors are preferably taken into account in the model for the power storage of the battery module.

The power controller 120 preferably creates a context-aware power budget from the analysis of the power production modules and the power storage modules. The context-aware power budget preferably includes how much instantaneous power can be drawn from the module power network no and how much steady state power can be drawn from the module power network no. The context-aware power budget is thus dependent on the power production and storage capability of the modular mobile electronic device, including the power production capability of the power production modules and the power storage capability of the power storage module. This power budget is preferably constrained by quality and safety parameters. The quality and safety parameters may include parameters on individual modules or parameters on the module power network no. Individual module quality and safety parameters are preferably communicated by the modules to the power controller 120, but may also be determined by the system 100. Some example individual module quality and safety parameters may include a maximum module temperature, a maximum module steady-state current draw, or a module input power waveform quality threshold. Some example module power network 110 quality and safety parameters include power bus voltage thresholds, connected module number thresholds, and power bus power waveform quality thresholds.

The power controller 120 preferably controls power storage through communication with the power storage modules and/or the PMCs 111. The power controller 120 preferably controls power storage in accordance with system power demand, system power supply, and/or power storage module identification data. The power controller 120 preferably controls power storage by directing power storage modules to store/release power according to power storage states set by the power controller 120. These power storage states preferably include whether the power storage module should be storing power, releasing power, or disconnected from the module power network 110, and any settings relating to how the power storage module releases and/or stores power (e.g. output voltage, input voltage, output current, input current). The power controller 120 may additionally or alternatively control power storage through use of the PMCs in (for example, disconnecting a module that continues to try to release power when directed not to).

One example of power storage control in accordance with system power demand, system power supply, and power storage module identification data is as follows: a modular mobile electronic device contains two power producing modules (fuel cell module and wall charger module), two power storage modules (a fast-discharge battery module and a slow-discharge battery module), and a module power network battery 113. The module power network no of the modular mobile electronic device uses a power bus (e.g., 602 of FIG. 6); module voltage regulation and the PMCs in allow power production modules to be operated in parallel on the bus. The fuel cell module is capable of producing 5 W at 5V DC for two hours (2000 mAh capacity) and is non rechargeable. The wall charger is capable of producing 10 W at 5V DC whenever plugged into a wall charger. The fast-discharge battery module is capable of producing 10 W at 5V DC for fifteen minutes (500 mAh capacity). The slow-discharge battery module is capable of producing 5 W at 5V DC for four hours (4000 mAh capacity). The module power network battery 113 is capable of producing 5 W at 5V DC for one hours (1000 mAh) capacity. These capabilities are known to the power controller 120 (as module identification data). The module power network no directs the wall charger power module produce power whenever possible; whenever power is being produced by the wall charger power module, the three batteries are preferably being charged by any available power not used by other systems of the mobile modular electronic device. The module power network no directs the fuel cell power module to provide power to the power bus only for critical applications and only when the two battery modules have no remaining capacity and the module power network battery 113 is below 25% charge (preserving enough charge for the module power network battery to operate the modular mobile electronic device in a low power state). When no power is being produced, the module power network 110 directs the slow-discharge battery to discharge first, with the fast-discharge battery used only in situations where pulses of high current are needed. After the slow-discharge battery has been completely discharged, the module power network 110 begins discharging the module power network battery 113, still using the fast-discharge battery only during high-current pulses. When the module power network battery 113 reaches 25% capacity, the module power network no switches to discharge any remaining energy in the fast-discharge battery, before finally returning to the module power network battery 113.

The power controller 120 preferably manages module power consumption by identifying power consumer modules, analyzing power consumption, allocating power consumption according to the context-aware power budget, and controlling power consumption.

The power controller 120 preferably identifies power consumer modules through communication with the modules; the modules preferably provide identification data to the power controller 120 indicating their power consumption characteristics. Additionally or alternatively, the power controller 120 may identify power consumer modules by any other suitable means.

The power controller 120 preferably analyzes power consumer modules by collecting data on the power consumer modules from the modules and/or the PMCs 111. This data may include power consumption data (e.g., current draw, voltage requirements, etc.), contextual data (e.g., state of the power consumer module, presence of other modules, state of other modules, state of the system 100), and any other data relevant to the power consumer modules. The power controller 120 preferably correlates this data to create a model of power consumption for each power consumer module given time, context (e.g. state of the power consumer module . . . ), and other relevant variables. These models are preferably combined to create a model of power consumption of the modular mobile electronic device. In one example, a processor module has a certain power draw for a given power state and a given temperature. These factors are preferably taken into account in the model for the power consumption of the processor module.

The power controller 120 preferably allocates the context-aware power budget to power consumer modules based on the identification data of power consumer modules and the analysis data of power consumer modules. The power controller 120 preferably adapts the allocation of the context-aware power budget in real-time, allowing the allocation to meet real-time system power demands.

The power controller 120 preferably allocates the context-aware power budget using a module priority score. The module priority score preferably assigns modules scores based on a module importance metric; the module importance metric is preferably a user experience benchmark, but may additionally or alternatively be any measure of module importance. The user experience benchmark preferably measures to what extent a module's power draw affects the experience of the mobile modular electronic device user. In particular, the user experience benchmark preferably includes how a module's power draw affects the experience of the user taking into account the power storage capacity of the mobile modular electronic device. For example, a module's power use of 500 mA has a much greater effect on a device with 1500 mAh capacity than on a device with 9500 mAh capacity.

Power consumer modules preferably have multiple power states of operation; therefore, these states may have different user experience benchmark scores. Likewise, power consumer module priority scores may depend not only on the module, but also on the power state of the module.

Power consumer modules are preferably allocated portions of the context-aware power budget in order to create a high overall user experience score, but additionally or alternatively may be allocated power using any suitable method. One way the module controller 120 might allocate power involves weighting the module priority scores of module/power state combinations by their power usage, and optimizing for a high total score (where total score is the sum of the weighted scores).

The power controller 120 preferably takes into account module function redundancy when allocating power. If there are two modules capable of performing the same task, the power controller 120 may prioritize one over the other based on the context-aware power budget. For example, if the mobile electronic device includes two processors, a low-power processor and a high-power processor, the power controller 120 may operate only the low-power processor when the high-power processor is not needed (this would be reflected in the module priority score) or the context-aware power budget is low.

The power controller 120 preferably controls power consumption according to the context-aware power budget through communication with the power consumer modules and/or the PMCs 111. The power controller 120 preferably controls power consumption in accordance with the context-aware power budget and/or power consumer module identification data. The power controller 120 preferably controls power consumption by directing power consumer modules to operate according to power states set by the power controller 120. These power states preferably include module operating instructions and are linked to particular power consumption levels. The power controller 120 may additionally or alternatively control power consumption through use of the PMCs in (for example, disconnecting a module that continues to try to draw power when directed not to).

The power controller 120 preferably additionally controls power consumption by coordinating power draw timing between modules. For example, if the power controller 120 detects that two separate modules of the mobile electronic device have periodic high current spikes for short durations, the power controller 120 may direct the modules to draw those high current spikes at different times (to avoid overloading the system 100).

The power controller 120 preferably stores data relating to the operation of module power network no in its memory. This data preferably instructs the power controller 120 how to manage the module power network no and the modules based on the state of the modular mobile electronic device.

In a variation of the preferred embodiment, the power controller 120 may itself be managed or controlled by a module or other controller connected to the system 100. For instance, if an application processor module is connected the system 100, that application processor may be able to modify the operation of the power controller 120, including modifying the contents of the power controller 120 storage and/or usurping some functionality from the power controller 120.

The module interfaces 130 function to enable the connection of modules to the system 100. In some implementations, the module interfaces 130 are similar to the module interfaces described in U.S. application Ser. No. 14/462,849, filed on 19-Aug.-2014, which is incorporated in its entirety by this reference.

The module interfaces 130 are preferably connected to the module power network no with conductive wires, but may additionally or alternatively be connected to the module power network 110 in any suitable manner as previously described. The module interfaces 130 may connect modules to the module power network no in any suitable manner (e.g., electrically, optically). For example, modules may connect to the module interface 130 using contact methods (e.g., conductive contact via plug and socket) and/or non-contact methods (e.g., optical, capacitive, and RF data/power transfer methods). The module interfaces 130 are preferably identical, allowing any compatible modules to connect to any module interface 130 of the system 100, but may alternatively be non-identical (e.g., separate interface types for different module types).

2. Method for Power Management of a Modular Mobile Electronic Device

Figure 5:
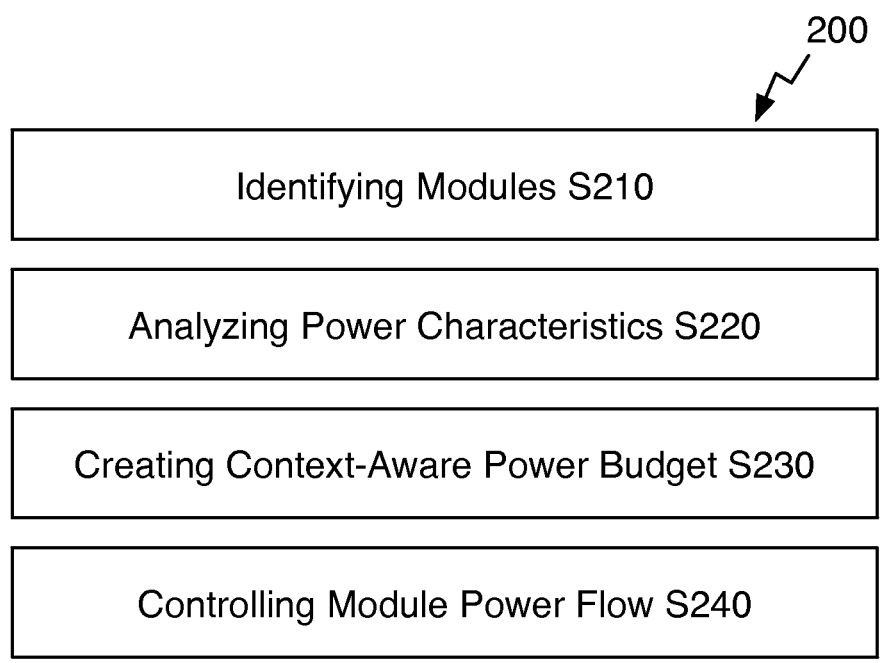
FIG. 5 is a chart view of a method of a preferred embodiment.

As shown in FIG. 5, a method for power management of a modular mobile electronic device 200 includes identifying modules S210, analyzing module power characteristics S220, creating a context-aware power budget S230, and controlling module power flow according to the context-aware power budget S240.

The method 200 functions to enable power management for a modular mobile electronic device. Power management is of importance for all mobile electronic devices: mobile electronic devices must make efficient use of power or be hindered in their usefulness by large batteries and/or frequent charging. Power management is even more important for modular mobile electronic devices because both power consumption and power available depend greatly on the configuration of the modular mobile electronic devices. This dependence means that power management systems for mobile electronic devices should be efficient in managing power resources and power consumption for a wide variety of modular mobile electronic device configurations.

Step S210 includes identifying modules. Modules are preferably identified from identification data transmitted by the modules, but may additionally or alternatively be identified using power monitoring units external to the modules or using any other suitable means. Identifying modules preferably includes identifying modules as power consumers, power storage, and/or power producers (modules may be any or all of the preceding) and determining their power consumption/power storage/power production capabilities. Modules are preferably identified whenever they are added to the modular mobile electronic device. Modules may additionally be identified or re-identified at any time, including after a boot or wake process of the modular mobile electronic device or after any module or device configuration change.

Step S220 includes analyzing module power characteristics. Modules are preferably analyzed by collecting data on the module power characteristics from the modules or from power monitors external to the modules. Collected data may include power production data (e.g., output voltage, output current, voltage/current waveform, duty cycle, etc.), power storage data (e.g., output voltage, output current, voltage/current waveform, duty cycle, charge rate, capacity, etc.), power consumption data (e.g., current draw, voltage requirements, etc.), contextual data (e.g., state of the module, presence of other modules, state of other modules), and any other relevant data.

Analyzing module power characteristics S220 preferably includes creating a module power model. The module power model preferably takes into account time, context, and other relevant variables and can be used to predict module power characteristics based on these variables. In one example, a processor module has a certain power draw for a given power state and a given temperature. These factors are preferably taken into account in the power model of the processor module. In another example, a solar power module produces a particular output voltage and current for a given time of day, location, device orientation, and set of weather conditions. These factors are preferably taken into account in the power model of the solar power module. In a third example, a battery module produces a particular output voltage and current for a given temperature and charge percentage. These factors are preferably taken into account in the power model of the battery module. Power models may be formed using information from any suitable source, including manufacturer information and information derived from module use data (which may be crowd-sourced). Power models are preferably dynamic and may be altered by new information, but may alternatively be static.

In an implementation, analyzing module power characteristics S220 includes, during operation of an electronic device of the system 100: controlling the power controller 120 to collect module power characteristic data of a plurality of modules coupled to the system 100, each module being coupled to the system 100 via a respective module interface (e.g., 130) of the system 100; and controlling the power controller 120 to update a module power model for at least one module of the plurality of modules based on module power characteristic data collected for the at least one module.

Analyzing module power characteristics S220 preferably also includes creating a system-level power model based on the module power models. The system-level power model preferably can predict the power characteristics of a modular mobile electronic device based on time, context, state, and other relevant variables.

In an implementation, analyzing module power characteristics S220 includes, during operation of the electronic device of the system 100: controlling the power controller 120 to update a system-level power model responsive to updating of a module power model for a module coupled to the system 100 via a module interface (e.g., 130).

In an implementation, analyzing module power characteristics S220 includes controlling the power controller to update a context-aware power budget of the system 100 based on updating of a module power model. In an implementation, analyzing module power characteristics S220 includes controlling the power controller to update a context-aware power budget of the system 100 responsive to updating of the system-level power model, the system-level power model being updated responsive to updating of a module power model.

Step S230 includes creating a context-aware power budget. Creating a context-aware power budget S230 preferably includes determining how much instantaneous power and steady state power can be supplied to modules by a modular mobile electronic device. Power determinations are preferably based on the system-level power model, but may additionally or alternatively be based on any suitable power characteristic data. The context-aware power budget is preferably dependent on the power production and storage capability of the modular mobile electronic device, including the power production capability of the power production modules and the power storage capability of the power storage module. The context-aware power budget is preferably constrained by quality and safety parameters. The quality and safety parameters may include parameters on individual modules or parameters of the modular mobile electronic device. Some example individual module quality and safety parameters may include a maximum module temperature, a maximum module steady-state current draw, or a module input power waveform quality threshold. Some example modular mobile electronic device quality and safety parameters include power bus voltage thresholds, connected module number thresholds, and power bus power waveform quality thresholds.

Step S240 includes controlling module power flow according to the context-aware power budget. Module power flow (including module power storage, module power production, and/or module power consumption) is preferably controlled through communication with the modules, but may additionally or alternatively be controlled using power monitors or controllers external to the modules or using any suitable means. Module power flow is preferably controlled in accordance with system power supply/demand, module identification data, module power models, the system-level power model, and/or the context-aware power budget. Module power flow is preferably controlled by setting module power states through communication with the modules, but may additionally or alternatively be controlled in any suitable manner. Module power states preferably include whether modules should be producing/storing/consuming power, and any settings relating to how the module produces power (e.g. output voltage, fuel burn rate, output current), stores power (e.g. output voltage, discharge rate, preferred charged capacity), or consumes power (e.g. power draw rate, module configuration, module operating instructions). Examples of module power flow control can be found in the description of the system 100.

Controlling module power flow according to the context-aware power budget S240 preferably includes allocating the context-aware power budget to power consumer modules based on the identification data of power consumer modules and the analysis data of power consumer modules. The allocation of the context-aware power budget is preferably adapted in real-time, allowing the allocation to meet real-time system power demands.

In some implementations, controlling module power flow according to the context-aware power budget S240 includes: controlling the power controller to adapt module power flow of the electronic device of the system 100 based on updates to the context-aware power budget. In some implementations, the power controller updates the context-aware power budget based on updates to module power models for modules coupled to the system 100. In some implementations, adapting module power flow includes allocation of power in real-time to at least one power consumer module coupled the system 100 via a respective module interface (e.g., 130).

In some implementations, adapting module power flow includes controlling power production by at least one of: controlling at least one power production module coupled to the system 100 via a module interface; and controlling at least one PMC in that is coupled to a power production module.

In some implementations, adapting module power flow includes controlling power storage by at least one of: controlling at least one power storage module coupled to the system 100 via a module interface; and controlling at least one PMC in that is coupled to a power storage module.

In some implementations, adapting module power flow includes controlling at least one PMC in of the system 100 to perform at least one of: limiting current draw via a module interface 130 coupled to the PMC in by using a current limiter; and decoupling the module interface 130 from a power network no of the system 100 by using an interface switch of the interface 130.

The context-aware power budget is preferably allocated using a module priority score. The module priority score preferably assigns modules scores based on a module importance metric; the module importance metric is preferably a user experience benchmark, but may additionally or alternatively be any measure of module importance. The user experience benchmark preferably measures to what extent a module's power draw affects the experience of the mobile modular electronic device user. In particular, the user experience benchmark preferably includes how a module's power draw affects the experience of the user taking into account the power storage capacity of the mobile modular electronic device. For example, a module's power use of 500 mA has a much greater effect on a device with 1500 mAh capacity than on a device with 9500 mAh capacity.

Power consumer modules preferably have multiple power states of operation; therefore, these states may have different user experience benchmark scores. Likewise, power consumer module priority scores may depend not only on the module, but also on the power state of the module.

Power consumer modules are preferably allocated portions of the context-aware power budget in order to create a high overall user experience score, but additionally or alternatively may be allocated power using any suitable method. One way power might be allocated involves weighting the module priority scores of module/power state combinations by their power usage, and optimizing for a high total score (where total score is the sum of the weighted scores).

Module function redundancy is preferably taken into account when allocating power. If there are two modules capable of performing the same task, one may be prioritized over the other based on the context-aware power budget. For example, if the mobile electronic device includes two processors, a low-power processor and a high-power processor, the low-power processor may be operated only when the high-power processor is not needed (this would be reflected in the module priority score) or the context-aware power budget is low.

Step S240 may additionally include controlling power consumption by coordinating power draw timing between modules. For example, if it is detected that two separate modules of the mobile electronic device have require high current spikes for short durations, the modules may be directed to draw those high current spikes at different times (to avoid overloading the modular mobile electronic device).

The method 200 is preferably implemented by the system 100, but may alternatively be implemented by any other suitable means.

3. Simultaneous Use of Multiple Power Sources

As described above, the module power network 110 of the system 100 uses a power bus to supply power to modules. In an implementation, the power bus operates at a single unregulated DC voltage set in part by power source modules (e.g., a power production module supplying power, a power storage module supplying power, and the like) coupled to the power bus, and the power bus voltage is set by the highest voltage power source coupled to the power bus. In an implementation in which power bus voltage regulation is not performed for power provided by the power bus to modules coupled to the power bus, module voltage regulation is dynamically performed for power provided by power source modules to the power bus. By performing dynamic module voltage regulation for power source modules, power efficiency can be improved in a case where a plurality of power source modules supply power to the power bus in parallel.

More specifically, in a case in which a plurality of power source modules are electrically coupled to the power bus to supply power to the power bus in parallel, voltage regulation is enabled for each power source module having a power supply voltage less than the highest power supply voltage among the power source modules supplying power to the power bus. Enabling voltage regulation for a power source module includes enabling a voltage regulator electrically coupled to the power source module, and controlling the voltage regulator to increase the power supply voltage of the power source module to the highest power supply voltage among the power source modules supplying power to the power bus. In a case where a power source module is coupled to or decoupled from the power bus, the power controller 120 determines a highest power supply voltage among the power source modules supplying power to the power bus, and selectively enables voltage regulators electrically coupled to power source modules having a lower power supply voltage (to increase the power supply voltage to the determined highest voltage).

For example, in a case were a first module interface (e.g., the module interfaces 130 of FIGS. 1 and 2) is electrically coupled to a high-voltage-low-capacity battery and a second interface is electrically coupled to a low-voltage-high-capacity battery, voltage regulation is used to step-up the voltage of the low-voltage-high-capacity battery to the voltage of the high-voltage-low-capacity battery in a case where both batteries simultaneously provide power to the power bus. By performing module voltage regulation so that power is received by the power bus from each power source at a same voltage, power efficiency of the modular mobile electronic device that includes the system 100 can be improved.

In an exemplary arrangement in which a fast-discharge battery module capable of producing 10 W at 5V DC for fifteen minutes (500 mAh capacity) and a slow-discharge battery module capable of producing 3.3 W at 3.3 V DC for four hours (4000 mAh capacity) simultaneously provide power to the power bus, voltage regulation is used to step-up (increase) the voltage supplied by the slow-discharge battery module to 5V DC (e.g., the voltage of the fast-discharge battery module). In such an arrangement, when capacity of the fast-discharge battery module falls below a threshold amount, the power controller 120 disables the fast-discharge battery module (e.g., by controlling the PMC 111 coupled to the fast-discharge battery module) and disables the voltage regulator coupled to the slow-discharge battery module. In other words, when the fast-discharge battery module is near depletion the fast-discharge battery module is disabled, and since the slow-discharge battery module then provides the highest voltage (e.g., it is the only module supplying power to the power bus), module voltage regulation is no longer needed for the slow-discharge battery module (and thus the power controller 120 disables the voltage regulator for the slow-discharge battery module).

Figure 6:
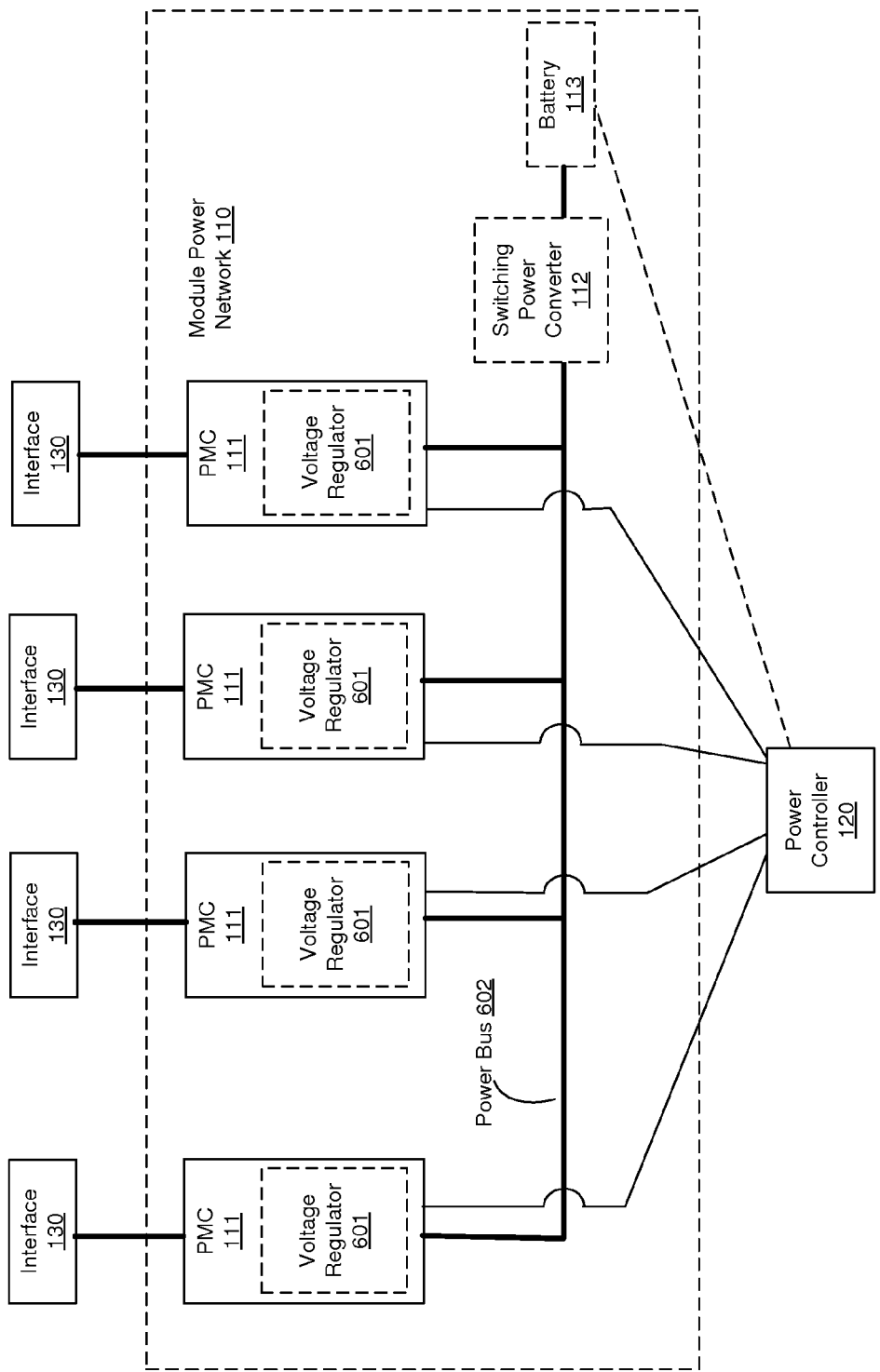
FIG. 6 is a diagram view of a module power network of a system of a preferred embodiment.

As shown in FIG. 6, the power bus 602 is electrically coupled to the PMCs 111. In some implementations, the power bus 602 is electrically coupled to the switching power converter 112. In some implementations, the power bus 602 is electrically coupled to the battery 113. In some implementations, the power bus 602 is electrically coupled to the battery 113 via the power converter 112. In some implementations, the PMCs 111 include voltage regulators 601. In some implementations, the interfaces 130 include voltage regulators. In some implementations, the power bus 602 includes voltage regulators for each interface 130.

The power controller 120 is coupled to each PMC 111. In some implementations, the power controller 120 is coupled to the voltage regulators (e.g., the voltage regulators 601 of the PMCs 111, as shown in FIG. 6). The power controller 120 controls the voltage regulators (e.g., the voltage regulators 601) as described above. In some implementations, the power controller 120 controls the voltage regulators to enable and disable voltage regulation, and to set a regulated voltage. In some implementations, the power controller 120 controls the PMCs 111 to control the voltage regulators to enable and disable voltage regulation, and to set a regulated voltage.

Figure 7:
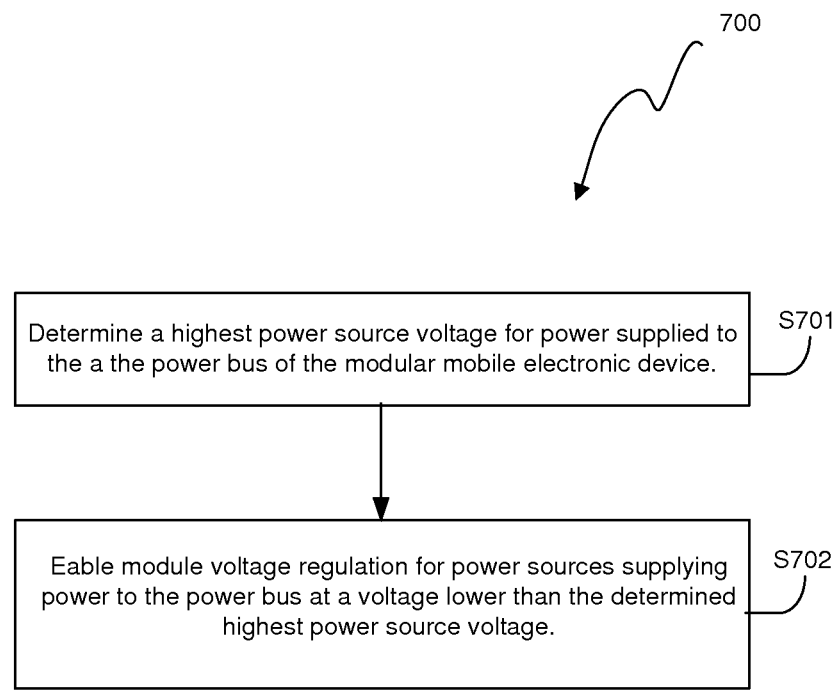
FIG. 7 is a chart view of a method of a preferred embodiment.

As shown in FIG. 7, a method for voltage regulation of a modular mobile electronic device 700 includes: determining a highest power source voltage for power supplied to the power bus of the modular mobile electronic device (S701); and enabling module voltage regulation for power sources supplying power to the power bus at a voltage lower than the determined highest power source voltage (S702).

The method 700 functions to provide dynamic module voltage regulation for power source modules. By performing dynamic module voltage regulation for power source modules, power efficiency can be improved in a case where a plurality of power source modules supply power to the power bus in parallel.

In some embodiments, power source modules include power producing modules (e.g., fuel cell modules, charger modules, solar panel modules) and power storing modules (e.g., battery modules, capacitor modules) that supply power to the power bus (e.g., 602 of FIG. 6). In some embodiments, power source modules include power storing modules.

In some implementations, determining a highest power source voltage for power supplied to the power bus of the modular mobile electronic device (S701) includes: determining whether a power source event has occurred, and determining the highest power source voltage responsive to a determination that a power source event has occurred.

In some implementations, a power source event includes at least one of addition of a power source module to the modular mobile electronic device by coupling the at least one power source module to the system 100, removal of a power source module from the electronic device (e.g., decoupling the module from the system 100), disabling of a power source module, enabling of a power source module, reduction of power storage capacity of a power source module below a threshold value, reduction of voltage supplied by a power source module below a threshold value, reduction of current supplied by a power source module below a threshold value, and reduction of power supplied by a power source module below a threshold value. In some implementations, determining the highest power source voltage is performed responsive to the electronic device of the system 100 being powered on.

In some implementations, the power controller 120 performs the determination of the highest power source voltage. In some implementations, the power controller 120 performs the determination of the highest power source voltage by using the PMCs 111. In some implementations, the power controller 120 performs the determination of the highest power source voltage by identifying modules as described above for S210 of FIG. 5. In some implementations, the power controller 120 performs the determination of the highest power source voltage by analyzing power characteristics as described above for S220 of FIG. 5. In some implementations, the power controller 120 performs the determination of the highest power source voltage by identifying modules as described above for S210 of FIG. 5 and by analyzing power characteristics as described above for S220 of FIG. 5.

In some implementations, enabling module voltage regulation for power sources supplying power to the power bus at a voltage lower than the determined highest power source voltage (S702) includes: for each power source module supplying power to the power bus at a voltage lower than the determined highest power source voltage, enabling a voltage regulator (e.g., one of voltage regulators 601 of FIG. 6) that is coupled to the power source module, and setting a regulated output voltage of the voltage regulator to the determined highest power source voltage.

In some implementations, the power controller 120 enables module voltage regulation. In some implementations, the power controller 120 enables module voltage regulation by controlling the PMCs 111. In some implementations, the power controller 120 enables module voltage regulation by controlling the voltage regulators 601.

4. Module Communication Network Switch Bypass

Figure 8:
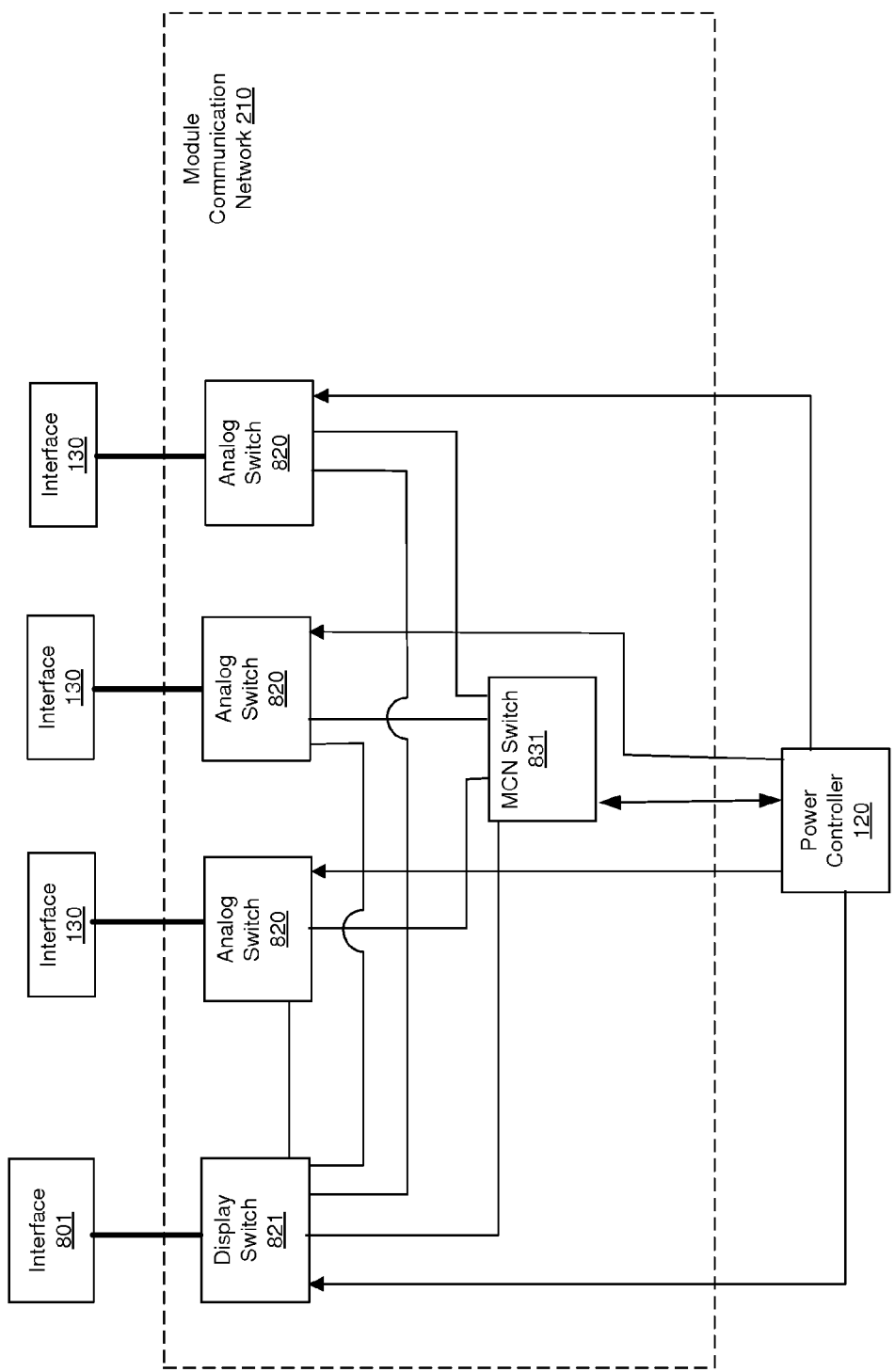
FIG. 8 is a diagram view of a module communication network of a system of a preferred embodiment.

As shown in FIG. 8, in an implementation, the module communication network (MCN) 210 includes a module communication network (MCN) switch 831. Each interface 130 is coupled to the MCN Switch 831 via a respective analog switch 820. Additionally or alternatively, each interface (or each interface of a subset of interfaces) is coupled to the MCN Switch 831 via a shared analog switch 820. In some implementations, the analog switch is a mechanical switch, such as, for example, a relay. In some implementations, the analog switch is an electrical switching circuit. In some implementations, electrical switching circuits include one or more of multiplexors, transistor circuits, an integrated circuit (IC) switch, and the like.

The interface 801 is an interface that is similar to the interfaces 130. The interface 801 is coupled to a display switch 821, and the display switch 821 is coupled to the MCN switch 831. The display switch 821 is similar to the analog switches 820, but differs in that the display switch is coupled to each analog switch 820.

The power controller 120 is coupled to the MCN switch 831, the display switch 821, and each analog switch 820. In the implementation of FIG. 8, the power controller 120 is constructed to control the MCN switch 831, each analog switch 820, and the display switch 821.

The MCN switch 831 is similar to the MCN switch described in U.S. application Ser. No. 14/462,849, filed on 19-Aug.-2014, which is incorporated in its entirety by this reference.

The MCN switch 831 functions to enable direct communication between modules by creating data links between modules (which the MCN switch 831 preferably can modify, monitor, or control). The MCN switch 831 preferably operates using packet switching, but may additionally or alternatively operate in any suitable manner. Direct communication preferably refers to data transfer that does not require a host or intermediary module for communication. For example, in the case of the MCN 210 utilizing the MCN switch 831, modules are preferably able to communicate directly by sending packets to the MCN switch 831, which then are sent directly to other modules based on the destination address (set by the originating module). This is distinct from an architecture that requires a host; for example, peripheral devices connected to a USB bus require a master device to be able to pass information between each other.

Figure 9:
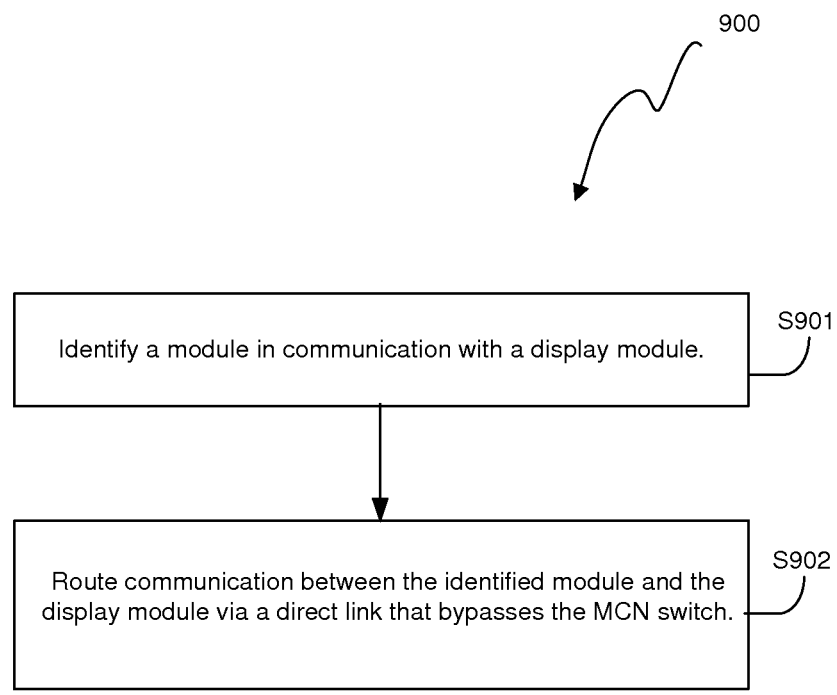
FIG. 9 is a chart view of a method of a preferred embodiment.

As shown in FIG. 9, a method 900 for module communication by using the module communication network 210 includes: identifying a module in communication with a display module coupled to the interface 801 (e.g., the interface coupled to the display switch 821) (S901); and routing communication between the identified module and the display module via a direct link that bypasses the MCN switch 831 (S902).

In an implementation, identifying a module in communication with a display module coupled to the interface coupled to the display switch (S901) includes: the power controller 120 using at least one of the MCN switch 831 and PMCs 111 to identify the module in communication with the display module.

In an implementation, routing communication between the identified module and the display module via a direct link that bypasses the MCN switch (S902) includes: the power controller 120 controlling the analog switch 820 that is coupled to the identified module to open an electrical circuit that provides communication between the identified module and the MCN switch 831; the power controller 120 controlling the analog switch 820 that is coupled to the identified module to close an electrical circuit that provides communication between the identified module and the display switch 821; the power controller 120 controlling the display switch 821 to open an electrical circuit that provides communication between the display module and the MCN switch 831; and the power controller 120 controlling the display switch 821 to close an electrical circuit that provides communication between the display module and the analog switch 820 of the identified module. In this manner, communication between the identified module and the display module is provided by the closed electrical circuit between the display switch 821 and the analog switch 820 of the identified module, such that the communication bypasses the MCN Switch 831. In an implementation, in a case where the power controller 120 determines (e.g., via communication with the MCN switch 831) that modules coupled to the interfaces 130 are not communicating with each other via the MCN switch 831, the power controller 120 turns off the MCN switch 831 or a subset of switching connections of the MCN switch 831. Additionally or alternatively, the MCN switch 831 may remain active, but a substantial part (or all) of communication between modules may be routed through direct connections. In an implementation, in a case where the power controller 120 decides to enable a power saving mode of the electronic device (e.g., the electronic device of the system 100), the power controller 120 turns off the MCN switch 831 after controlling the display switch 821 and the analog switch 820 to bypass the MCN switch 831.

While the previous section describes control of the analog switches by the power controller 120, the analog switches may additionally or alternatively be controlled by the MCN switch 831.

In some implementations, communication within the module communication network 210 is provided by optical connections, and the display switch 821 and the switches 820 are optical switches.

In some implementations, the power controller 120 is controlled to perform the method of FIG. 9 responsive to a determination to change a state of the system 100 to a power saving state.

Figure 10:
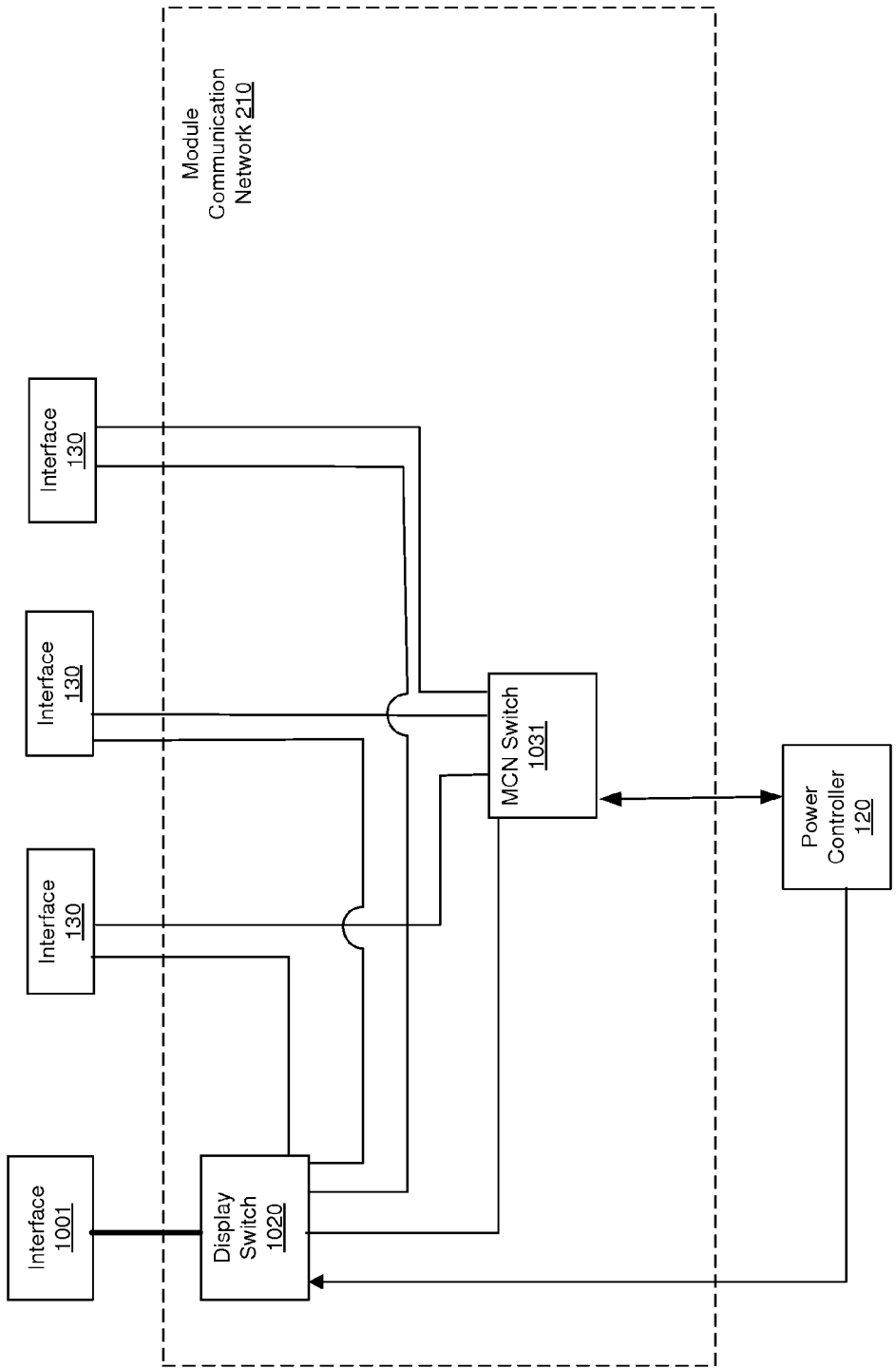
FIG. 10 is a diagram view of a module communication network of a system of a preferred embodiment.

As shown in FIG. 10, in an implementation, the module communication network 210 includes an MCN switch 1031 and a display switch 1020. The MCN switch 1031 is similar to the MCN switch 831 of FIG. 8.

Each interface 130 is coupled to the MCN Switch 1031. The interface 1001 is coupled to the MCN Switch 1031 via a display switch 1020. In some implementations, the display switch is an analog switch. In some implementations, the display switch is a mechanical switch, such as, for example, a relay. In some implementations, the display switch is an electrical switching circuit. In some implementations, electrical switching circuits include one or more of multiplexors, transistor circuits, an integrated circuit (IC) switch, and the like.

The interface 1001 is an interface that is similar to the interfaces 130. The interface 1001 is coupled to the display switch 1020, and the display switch 1020 is coupled to the MCN switch 1031. The display switch 1020 is coupled to each interface 130.

The power controller 120 is coupled to the MCN switch 1031 and the display switch 1020. In the implementation of FIG. 10, the power controller 120 is constructed to control the MCN switch 1031 and the display switch 1020.

Figure 11:
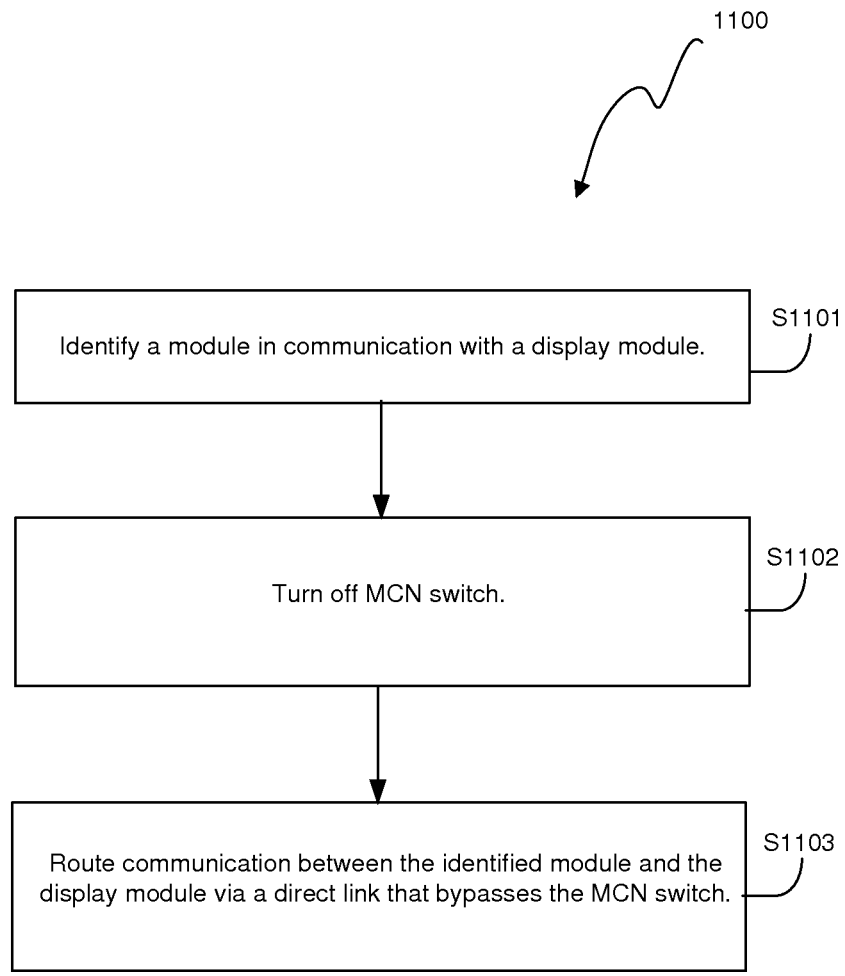
FIG. 11 is a chart view of a method of a preferred embodiment.

As shown in FIG. 11, a method 1100 for module communication by using the module communication network 210 includes, responsive to the system 100 changing state to a power saving state: identifying a module in communication with a display module coupled to the interface 1001 (e.g., the interface coupled to the display switch 1020) (S1101); turning off the MCN switch 1031 (S1102); and routing communication between the identified module and the display module via a direct link that bypasses the MCN switch 1031 (S1103).

In an implementation, identifying a module in communication with a display module coupled to the interface coupled to the display switch (S1101) is similar to process S901 of FIG. 9.

In an implementation, routing communication between the identified module and the display module via a direct link that bypasses the MCN switch (S1103) includes: the power controller 120 controlling the display switch 1020 to close an electrical circuit that provides communication between the display module and the interface 1030 of the identified module. In this manner, communication between the identified module and the display module is provided by the closed electrical circuit between the device switch 1020 and the interface 1030 of the identified module, while the MCN Switch is bypassed.

In some implementations, communication within the module communication network 210 is provided by optical connections, and the display switch 1020 is an optical switch.

5. Method for Real-Time Power Management of a Modular Mobile Electronic Device

A method disclosed herein includes: during operation of a modular mobile electronic device, using a power controller (e.g., 120) of a system (e.g., the system 100) of the electronic device to: collect module power characteristic data of a plurality of modules coupled to the system, each module being coupled to the system via a respective module interface (e.g., 130) of the system; update a module power model for at least one module of the plurality of modules based on module power characteristic data collected for the at least one module; update a context-aware power budget of the electronic device based on updating of the module power model for the at least one module; and adapt module power flow of the electronic device based on updates to the context-aware power budget, wherein adapting module power flow comprises adapting allocation of power in real-time to at least one power consumer module coupled to the system via a respective module interface.

An alternative embodiment preferably implements the above methods in a computer-readable medium storing computer-readable instructions. The instructions are preferably executed by computer-executable components preferably integrated with a system consisting of a plurality of modules and a module power controller. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. As a person skilled in the art will recognize from the previous detailed description and from the figures and claims, modifications and changes can be made to the preferred embodiments of the invention without departing from the scope of this invention defined in the following claims.

What is claimed is:

1. A method comprising:
during operation of a modular mobile electronic device, using a power controller of a system of the electronic device to:
collect module power characteristic data of a plurality of modules coupled to the system, each module being coupled to the system via a respective module interface of the system;
update a module power model for at least one module of the plurality of modules based on module power characteristic data collected for the at least one module;
update a context-aware power budget of the electronic device based on updating of the module power model for the at least one module;
adapt module power flow of the electronic device based on updates to the context-aware power budget,
wherein adapting module power flow comprises adapting allocation of power in real-time to at least one power consumer module coupled the system via a respective module interface and wherein adapting module power flow comprises using the power controller to bypass a module communication network packet switch of the electronic device for communication between modules coupled to the system via respective module interfaces.

2. The method of claim 1, wherein collected module power characteristic data of a module includes at least one of power production data, power storage data, power consumption data, and contextual data.

3. The method of claim 1, wherein collected module power characteristic data of a module includes at least one of state of the module, presence of other modules coupled to the system via respective module interfaces, and state of the other modules.

4. The method of claim 1 further comprising using the power controller to: update a system-level power model responsive to updating of the module power model for the at least one module.

5. The method of claim 1, wherein the module power characteristic data collected for a module is data generated by a power monitor/control unit (PMC) coupled to the module via the module interface of the module, the PMC generating the data during operation of the electronic device and the module.

6. The method of claim 1, wherein the plurality of modules includes at least one power storage module and at least one power consumer module.

7. The method of claim 6, wherein the plurality of module includes at least one power production module.

8. The method of claim 1, wherein adapting module power flow comprises controlling power production by at least one of:
controlling at least one power production module coupled to the system via a module interface; and
controlling at least one PMC that is coupled to a power production module.

9. The method of claim 8, wherein adapting module power flow comprises controlling power storage by at least one of:
controlling at least one power storage module coupled to the system via a module interface; and
controlling at least one PMC that s coupled to a power storage module.

10. The method of claim 5, wherein adapting module power flow comprises controlling at least one PMC of the system to perform at least one of limiting current draw via a module interface coupled to the PMC by using a current limiter; and decoupling the module interface from a power network of the system by using an interface switch.

11. The method of claim 1, wherein adapting allocation of power in real-time to at least one power consumer module comprises adapting the allocation of power by using a module priority score of the at least one power consumer module, the priority score being based on a user experience benchmark that indicates the extent to which the at least one power consumer module's power draw affects a user experience of the electronic device.

12. The method of claim 1, wherein in a case where two or more power consumer modules perform a same task, adapting allocation of power in real-time to at least one power consumer module comprises adapting the allocation of power by allocating power to one of the two or more power consumer modules based on respective priority scores.

13. The method of claim 1, wherein adapting module power flow comprises coordinating power draw timing between two or more power consumer modules.

14. The method of claim 1, wherein adapting module power flow comprises using the power controller to control a plurality of power source modules to supply power via the system by using at least one module voltage regulator of the electronic device.

15. The method of claim 1, wherein adapting module power flow comprises using the power controller to bypass a module communication network packet switch of the electronic device for communication between a display module and another module coupled to the system via respective module interlaces.

16. A mobile electronic device system comprising:
a plurality of module interfaces, each module interface constructed to removably couple a module to the system;
a module power network constructed to provide power transfer between modules coupled to the system via respective ones of the plurality of module interfaces;
a power controller coupled to the module power network, the power controller constructed to, during operation of the system:
collect module power characteristic data of a plurality of modules coupled to the system, each module being coupled to the system via a respective module interface;
update a module power model for at least one module of the plurality of modules based on module power characteristic data collected for the at least one module;
update a context-aware power budget of the electronic device based on updating of the module power model for the at least one module; and
adapt module power flow of the module power network based on updates to the context-aware power budget,
a module communication network (MCN) constructed to enable data transfer between modules coupled to the system via respective module interfaces, the MCN including an MCN packet switch constructed to direct communication between modules via data links between the modules;
a first switch coupled to a first module interface of the plurality of module interfaces and switchably coupled to the MCN packet switch, the first switch constructed to communicatively decouple from the MCN packet switch responsive to control provided by the power controller;
wherein adapting module power flow comprises adapting allocation of power in real-time to at least one power consumer module coupled the system via a respective module interface and wherein the first switch is constructed to communicatively couple to a second module interface responsive to control provided by the power controller.

17. The system of claim 16, further comprising a plurality of voltage regulators, each voltage regulator electrically coupling a respective module interface to a power bus of the module power network.

18. The system of claim 16, further comprising:
a plurality of module interface communication switches, each module interface communication switch being coupled to one of the plurality of module interfaces and switchably coupled to the MCN packet switch;
wherein the first switch comprises a display switch that is constructed to communicatively couple to one of the module interface communication switches responsive to control provided by the power controller; and
wherein each module interface communication switch is constructed to communicatively decouple from the MCN packet switch responsive to control provided by the power controller.

19. The system of claim 16, wherein the first switch comprises a display switch.

20. The system of claim 16, wherein the module power network includes a power bus having a power bus voltage range of 3.3 to 4.8 VDC.

* * * * *